United States Patent [19]

Caudrelier

[11] Patent Number: 5,418,884
[45] Date of Patent: May 23, 1995

[54] PROCESS AND APPARATUS FOR DEGREASING A FIBER-OPTIC CABLE

[75] Inventor: Jacques Caudrelier, Villorceau, France

[73] Assignee: France Telecom, Paris, France

[21] Appl. No.: 203,819

[22] Filed: Feb. 24, 1994

[30] Foreign Application Priority Data

Mar. 5, 1993 [FR] France .................... 93 02606

[51] Int. Cl.⁶ ............... G02B 6/00; G02B 6/14
[52] U.S. Cl. ................................... 385/147
[58] Field of Search ............... 134/15, 37, 40; 385/147

[56] References Cited

U.S. PATENT DOCUMENTS

| | | | |
|---|---|---|---|
| 4,156,619 | 5/1979 | Greisshammer | 134/37 |
| 5,264,046 | 11/1993 | Winston et al. | 134/40 |
| 5,268,035 | 12/1993 | Neubauer et al. | 134/40 |
| 5,268,036 | 12/1993 | Neubauer et al. | 134/40 |

FOREIGN PATENT DOCUMENTS 0170274 2/1986 European Pat. Off. .
0289875 11/1988 European Pat. Off. .
0679019 12/1991 Switzerland .

OTHER PUBLICATIONS

Abstract only of Soviet Union 1,733,127; Dec. 1989.
Abstract only of Japan 0619585; Jan. 1986.

*Primary Examiner*—Rodney B. Bovernick
*Assistant Examiner*—Robert E. Wise
*Attorney, Agent, or Firm*—Roland Plottel

[57] ABSTRACT

A process for cleaning and in particular degreasing optical fibers (6) emerging from the stripped end of the sheath of a cable (5), surrounding in particular a plurality of such fibers protected by a material based on grease or the like. According to the invention, this process consists in utilizing a liquid solvent (13) applied to the external surface of the fiber in the form of a foam, composed of a mixture of solvent and air, increasing the contact surface of the fiber and the solvent. The subject of the invention is also an apparatus for carrying out this process.

6 Claims, 1 Drawing Sheet

PROCESS AND APPARATUS FOR DEGREASING A FIBER-OPTIC CABLE

The present invention relates to a process permitting the performance, in a rapid and effective manner, of the cleaning of optical fibers, in particular their degreasing, without a risk, in particular, of shattering these fibers in consequence of uncontrolled loads exerted on them in the course of this operation. The invention likewise relates to an apparatus for carrying out this process.

It is known that one of the conditions necessary for the formation of splices appropriate for the connection between two optical fibers, for example in the course of the cabling of a signal transmission network, demands that these fibers be entirely clean and, in particular, cleared of any trace of grease. Now, fiber-optic cables, in particular the cables referred to as monomode cables are filled, between their external sheath and the parallel or adjacent fibers which it surrounds, with an insulator which is generally a lubricant product of the type of a gel of petroleum or of another comparable, similar product or even constituted by a synthetic grease which impregnates the external surface of these fibers. When the cable is stripped over a fraction of its end in order to form a splice between at least one of its fibers and a homologous fiber of an adjacent cable, it is accordingly necessary for these fibers to be cleared of the grease which surrounds their terminal parts, or even the external sheath of the cable, when said sheath has been placed in position within a conduit which is generally buried, into which, as appropriate, the cable has been introduced by means of a method according to which the drawing of this cable, along the length of the conduit, is undertaken while simultaneously injecting an appropriate lubricant into the latter.

The methods which are in most general use for degreasing a fiber-optic cable consist in subjecting the latter to a treatment with ultrasonic waves within a container or a vessel into which the cable or at least that part of the latter which is to be degreased is immersed in advance. However, this technique is not entirely satisfactory.

In fact, the ultrasonic container is customarily a laboratory apparatus which proves to be entirely unsuitable for use on construction sites, by reason of its fragility and of the dimensions, which are in general too small, of this container, not permitting the immersion therein of the entirety of the cable or at least of those parts of the latter which are to be cleaned. In addition, with such an apparatus it is necessary to empty the vessel systematically before each transfer of the apparatus from one construction site to another, prior to a new filling of said vessel, which demands adjustments which have to be repeated before each new use, these adjustments being lengthy and necessitating a relatively specialized personnel. For this reason, most frequently the fitters do not perform such a cleaning with ultrasonic waves, but restrict themselves to a simple manual degreasing; this involves numerous risks of breakage or of rupture of the optical fibers of the cable, especially where the latter includes a large number of adjacent fibers, in the order of 20 to 30, with, moreover, a poor quality of the splices formed.

Even with an ultrasonic container, the results obtained are scarcely convincing; this frequently necessitates an increase in the duration of the cleaning. However, the phenomenon of cavitation within the liquid contained in the container or the vessel which then appears, frequently causes the appearance of microcavities which sometimes lodge between the grease and the fibers, bringing about the detachment of this grease, not only at the end of the fibers where it is desired to effect the splice, but within the sheath itself; this may seriously impair the fibers and disturb their regular relative positioning within the sheath.

Finally, the ultrasonic containers necessitate an accurate electrical power supply and regulation device, generally operating at 220 volts; this is scarcely practical on a construction site and presents dangers, a low voltage supply in the order of 12 volts being far preferable.

The subject of the invention is a process for cleaning optical fibers, which process avoids recourse to ultrasonic waves, i.e to complex laboratory apparatuses utilized to produce and to control such waves, and thus alleviates the disadvantages of this conventional method.

The process according to the invention arises in particular from the observation according to which chemical compounds have a tendency to react between them more rapidly and more efficiently when the contact surface of the reactant products increases. In the case which is under more particular consideration, where what matters is to eliminate a grease deposit on the surface of an optical fiber at the stripped end of a cable, the solvent utilized is petroleum, which dissolves the greases encountered. As the surface of the fiber is finished, there is thus an increase in the active surface of the petroleum, by using the latter no longer in the form of a liquid but in the form of a foaming product. The fibers immersed in said foam are then very rapidly cleaned, the grease which covers them being eliminated in the form of an emulsion in a manner which is far more complete and effective, by intimate mixing with the solvent, which is itself emulsified.

According to the invention, the process under consideration for cleaning and in particular degreasing optical fibers emerging from the stripped end of the sheath of a cable, surrounding in particular a plurality of such fibers protected by a material based on grease or the like, consists in utilizing a liquid solvent applied to the external surface of the fiber in the form of a foam, composed of a mixture of solvent and air, increasing the contact surface of the fiber and the solvent.

Preferably, the solvent utilized is, in a manner known per se, a product based on petroleum or on a derivative of the latter; in a variant, this solvent may be a liquid chemical product which is known for its degreasing properties, such as trichloroethylene.

According to a particular feature of the process under consideration, the liquid solvent is finely divided and emulsified by continuous injection of a compressed air flow delivered within the liquid, the foam which is formed being situated above the level of this liquid.

Preferably, the fibers to be degreased are immersed in the foam, above the liquid level, the injection of air causing a continuous agitation of this foam in contact with the fibers.

Advantageously, finally, in a final step a wiping of the cleaned fibers is carried out in order to eliminate the excess foam subsisting on the surface of the fibers.

The subject of the invention is likewise an apparatus for carrying out the above process, defined in that it includes a vessel closed at its lower end by a base and open at its upper end, containing a volume of liquid solvent rising within the vessel up to a given level and, in the vicinity of the base of the vessel, at least one compressed air inlet duct opening into the vessel below the level of the liquid solvent, and means capable of forming an emulsion of air and of liquid by agitation within the vessel, the foam which is formed being collected above the level of the liquid solvent.

Preferably, and according to a particular feature, the apparatus according to the invention, the means for forming the emulsion of air and of liquid comprise perforated plates with multiple holes, extending parallel to the base of the vessel at a given distance below the level of the liquid. Advantageously, the vessel includes two perforated plates which are separated by a determined spacing within the liquid solvent.

According to another feature, the vessel likewise includes an external compressor, delivering into the duct the air introduced into the vessel, this compressor being driven by a motor controlled by a low voltage power supply, in particular at 12 volts.

Further features of the process for degreasing optical fibers and in particular of an apparatus for carrying out this process, will appear further by means of the description, which follows, of an embodiment, which is given on an indicative and non-limiting basis, with reference to the accompanying drawing, in which.

Figure 1:
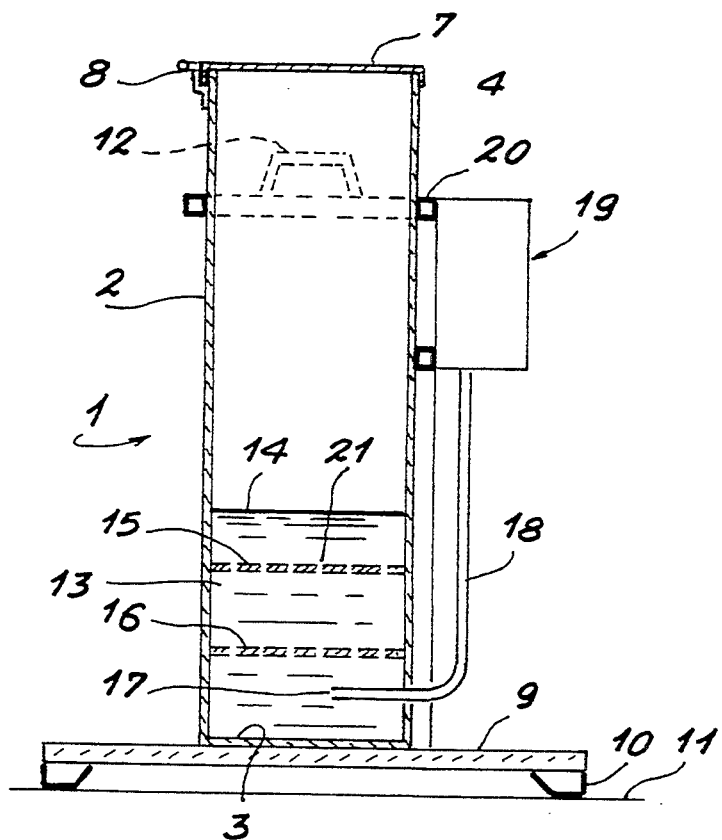
FIG. 1 is a diagrammatic view, in elevation and in cross section, of an apparatus according to the invention, filled with an appropriate solvent, but prior to the creation of an emulsion within the latter.
Figure 2:
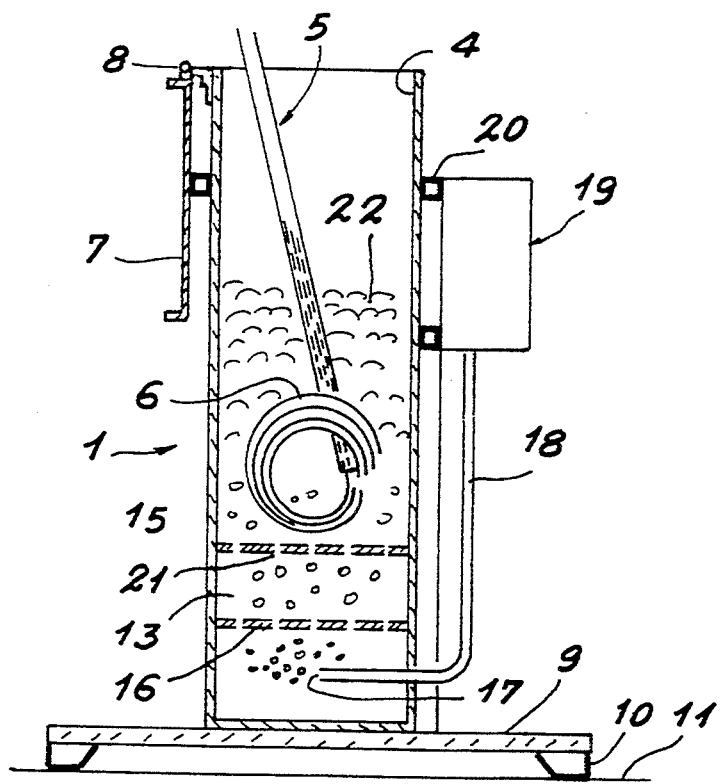
FIG. 2 is an identical view of the apparatus according to FIG. 1, but in which the solvent is emulsified by an appropriate air flow in such a manner as to permit the cleaning of the stripped ends of a fiber-optic cable.

In these figures, the reference 1 designates the vessel of the cleaning apparatus according to the invention, the lateral wall 2 of which is closed at its lower end by a base 3 and is normally open at its upper end 4 in order to permit the introduction, into the vessel, of a cable 5 incorporating optical fibers 6, the latter being grouped within the sheath of this cable and appropriately stripped (FIG. 2) over a sufficient length in order to permit the subsequent formation of connecting splices with the homologous fibers of another cable (not shown), the upper end 4 of the vessel being capable of being closed by a cover 7 mounted to pivot about an articulation 8 provided on the side of the wall 2.

The vessel 1 rests on a support plate 9 equipped with bearing feet 10 on the ground 11. It further includes, in its wall 2, towards the exterior of the vessel, handles 12 permitting the handling thereof to be ensured.

The interior of the vessel is partially filled by means of a liquid solvent 13, which is chosen as a function of its degreasing properties, especially constituted by petroleum or a similar product, for example trichloroethylene or a compound incorporating the latter. The upper level 14 of the liquid solvent 13 in the vessel 1 rises to a determined height, very far below the edge of the wall 2 of this vessel at its upper end 4, about to one third of the height of this vessel. Moreover, and according to the invention, the wall 2 is associated with transverse perforated plates such as 15 and 16, parallel to one another and extending horizontally below the level 14 and being separated from one another by a determined distance.

Below the lower plate 16 there opens, by its outlet orifice 17, a duct 18 which is connected at its opposite end, outside the vessel, to a low power compressor 19 which, in the embodiment under consideration, is mounted and made integral with the wall 2 outside the latter, with the aid of fixing studs 20.

In operation, the vessel 1 being filled with a solvent 13 under the above-cited conditions, the compressor 19 is controlled in such a manner that it delivers into the liquid solvent inside the vessel, via the duct 18, an air flow sufficient to create within this liquid a sufficient agitation and to permit the air which rises beyond the plates 15 and 16 in traversing the latter through a multiplicity of small diameter holes 21, formed along the surface of these plates, to create an emulsion with the solvent and to produce above the plates a volume of foam 22 which rises within the vessel 1 very significantly above the level 14 of the liquid at rest, for example as far as at least two thirds of the height of the vessel.

The cable 5 with its optical fibers 6 suitably stripped at its end is then immersed in the vessel after opening of the cover 7, in such a manner that the fibers are in permanent contact and continuously revived with the foam 22, which performs a complete and effective degreasing of these fibers, without risk of creating flexural loads on the latter and of fracturing them.

Once the fibers 6 have thus been degreased, the cable 5 can easily be removed from the vessel 1 and, as appropriate, can undergo a final wiping with a dry paper which removes any final and possible traces of grease which may remain as well as the deposit of solvent on the surface of these fibers.

In a preferred embodiment of the invention, the vessel has a diameter of approximately 125 mm for a height in the order of 600 mm, the volume of liquid solvent in the vessel being approximately 1.5 l. The compressor is driven by a motor unit (not shown) operating at a voltage of 12 volts, but which could likewise be utilized with a power supply delivering current at 220 volts, with a convertor performing the desired voltage reduction.

The degreasing obtained is particularly complete and meticulous, the fibers being cleared of all traces of grease or any other traces, in particular in the case of monomode cables, in which these fibers are generally surrounded within their common sheath by a lubricant which fills this sheath around the fibers and makes it impossible to form in that state a satisfactory connecting splice.

Of course, it is self evident that the invention is not limited to the embodiment which has been more especially described hereinabove and shown with reference to the accompanying drawing; on the contrary, it embraces all variants thereof.

I claim:

1. A process for cleaning and in particular degreasing optical fibers (6) emerging from the stripped end of the sheath of a cable (5), surrounding in particular a plurality of such fibers protected by a material based on grease or the like, which consists in utilizing a liquid solvent (13) applied to the external surface of the fiber in the form of a foam, composed of a mixture of solvent and air, increasing the contact surface of the fiber and the solvent.

2. The process as claimed in claim 1, wherein the solvent utilized is, in a manner known per se, a product based on petroleum or on a derivative of the latter.

3. The process as claimed in claim 1, wherein the solvent is a liquid chemical product having degreasing properties, such as trichloroethylene.

4. The process as claimed in claim 1, wherein the liquid solvent is finely divided and emulsified by continuous injection of a compressed air flow delivered within the liquid, the foam which is formed being situated above the level of this liquid.

5. The process as claimed in claim 1, wherein the fibers to be degreased are immersed in the foam, above the liquid level, the injection of air causing a continuous agitation of this foam in contact with the fibers.

6. The process as claimed in claim 1, wherein in a final step a wiping of the cleaned fibers is carried out in order to eliminate the excess foam subsisting on the surface of the fibers.

* * * * *